(12) United States Patent
Yang et al.

(10) Patent No.: US 11,644,705 B2
(45) Date of Patent: May 9, 2023

(54) DISPLAY APPARATUS

(71) Applicant: Au Optronics Corporation, Hsinchu (TW)

(72) Inventors: Hao-Shiun Yang, Hsinchu (TW); Chien-Chi Chen, Hsinchu (TW); Shang-Chiang Lin, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 17/510,372

(22) Filed: Oct. 25, 2021

(65) Prior Publication Data
US 2022/0236608 A1    Jul. 28, 2022

(30) Foreign Application Priority Data
Jan. 27, 2021 (TW) ................. 110103097

(51) Int. Cl.
| | |
|---|---|
| *G02F 1/133* | (2006.01) |
| *G02F 1/1333* | (2006.01) |
| *G02F 1/1337* | (2006.01) |
| *G02F 1/13363* | (2006.01) |
| *G02F 1/1335* | (2006.01) |

(52) U.S. Cl.
CPC .. *G02F 1/133391* (2021.01); *G02F 1/133541* (2021.01); *G02F 1/133638* (2021.01); *G02F 1/133769* (2021.01)

(58) Field of Classification Search
CPC ......... G02F 1/133391; G02F 1/133769; G02F 1/133638; G02F 1/133541
See application file for complete search history.

(56) References Cited

U.S. PATENT DOCUMENTS

| | | | |
|---|---|---|---|
| 10,396,128 B2 | 8/2019 | Choi et al. | |
| 10,868,083 B2 | 12/2020 | Choi et al. | |
| 11,264,429 B2 | 3/2022 | Choi et al. | |
| 2009/0073080 A1 | 3/2009 | Meersman et al. | |
| 2010/0079700 A1* | 4/2010 | Hasegawa | G02F 1/133528 349/98 |
| 2011/0102302 A1* | 5/2011 | Watanabe | G09F 9/30 359/804 |
| 2013/0177751 A1 | 7/2013 | Oh et al. | |
| 2017/0020008 A1 | 1/2017 | Tsai et al. | |
| 2017/0278902 A1 | 9/2017 | Choi et al. | |
| 2018/0052312 A1* | 2/2018 | Jia | G02F 1/13336 |
| 2019/0227374 A1* | 7/2019 | Xie | H01L 29/786 |
| 2020/0006441 A1 | 1/2020 | Choi et al. | |
| 2021/0143228 A1 | 5/2021 | Choi et al. | |
| 2021/0199873 A1* | 7/2021 | Shi | G02B 27/0018 |

(Continued)

FOREIGN PATENT DOCUMENTS

| | | |
|---|---|---|
| CN | 101393702 | 3/2009 |
| CN | 102067197 | 5/2011 |

(Continued)

*Primary Examiner* — Towfiq Elahi
(74) *Attorney, Agent, or Firm* — JCIPRNET

(57) ABSTRACT

Provided is a display apparatus including a first display panel, a second display panel, and at least one light-absorbing layer. The first display panel has a first splicing surface. The second display panel has a second splicing surface opposite to the first splicing surface. The at least one light-absorbing layer is disposed on at least one of the first splicing surface and the second splicing surface.

6 Claims, 7 Drawing Sheets

(56) References Cited

U.S. PATENT DOCUMENTS

2021/0202804 A1* 7/2021 Sun ..................... H01L 27/322
2022/0190054 A1   6/2022 Choi et al.

FOREIGN PATENT DOCUMENTS

| CN | 103197361 | 7/2013 |
| --- | --- | --- |
| CN | 105047089 | 11/2015 |
| CN | 107230433 | 10/2017 |
| CN | 111357113 | 6/2020 |
| CN | 113707043 | 11/2021 |

* cited by examiner

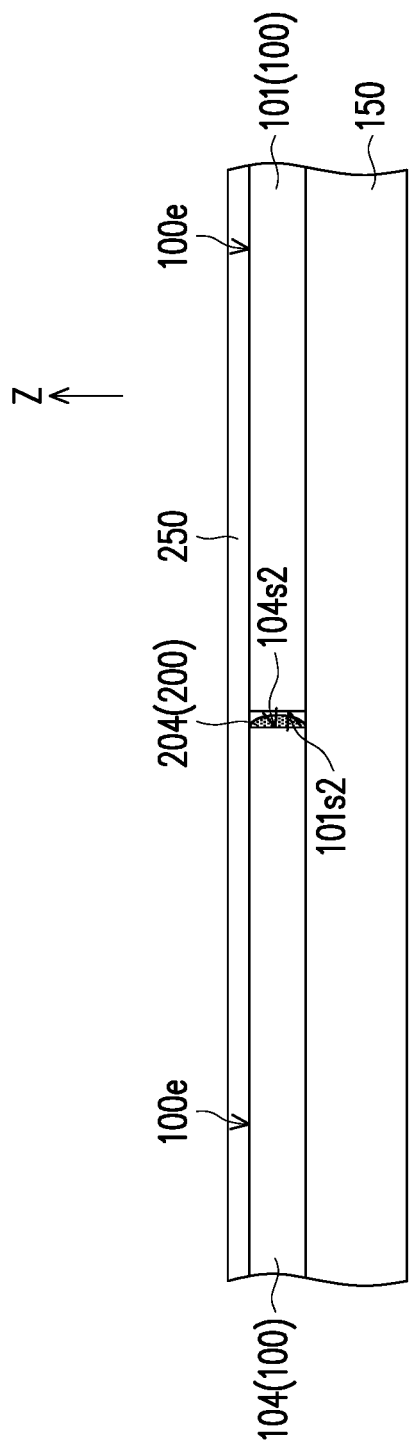
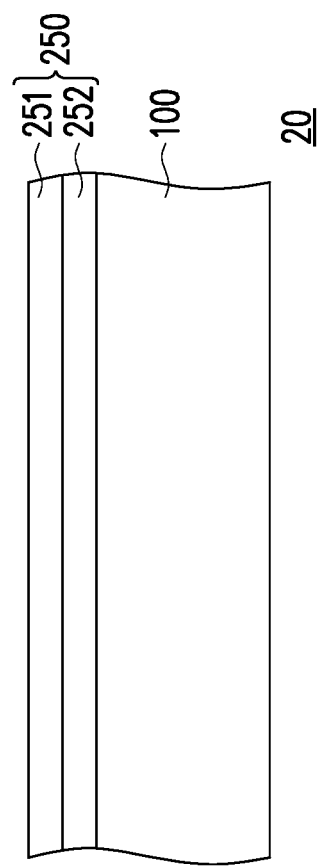

DISPLAY APPARATUS

CROSS-REFERENCE TO RELATED APPLICATION

This application claims the priority benefit of Taiwan application serial no. 110103097, filed on Jan. 27, 2021. The entirety of the above-mentioned patent application is hereby incorporated by reference herein and made a part of this specification.

BACKGROUND

Technical Field

The disclosure relates to a display apparatus, particularly to a spliced display apparatus.

Description of Related Art

As the applications of display apparatus diversify, large-scale display boards displaying public messages or advertisements are seen in every exhibition venues and department stores. And spliced display apparatus formed by splicing multiple display panels has become one of the most common configurations for such large-scale display boards, as it reduces the cost of installation and maintenance of large-scale display boards. Generally, the display panels of spliced display apparatus (such as light-emitting diode panels or liquid crystal display panels) have non-display areas at the periphery of the display area, but these non-display areas adjacent to the splice between two display panels may easily create visual image discontinuities (such as dark lines) in the display screen of the spliced display. To reduce the image discontinuity, light-emitting diode panels have gradually become favoured because of their narrow frame widths. Still, the visibility of the splicing seams between two light-emitting diode panels cannot be eliminated effectively.

SUMMARY

The present disclosure provides a display apparatus having splicing seams with low visibility.

The display apparatus of the present disclosure includes a first display panel, a second display panel, and at least one light-absorbing layer. The first display panel has a first splicing surface. The second display panel has a second splicing surface opposite to the first splicing surface. At least one light-absorbing layer is disposed on at least one of the first splicing surface and the second splicing surface.

In an embodiment of the present disclosure, the optical density of at least one light-absorbing layer of the display apparatus is 0.5 or more.

In an embodiment of the present disclosure, the optical density of at least one light-absorbing layer of the display apparatus is 4 or less.

In an embodiment of the present disclosure, the display apparatus further includes an optical auxiliary layer overlapping at least one light-absorbing layer. The reflectivity of the optical auxiliary layer is 6% or less.

In an embodiment of the present disclosure, the optical auxiliary layer of the display apparatus is a combination of a linear polarizer and a quarter-wave plate.

In an embodiment of the present disclosure, the optical auxiliary layer of the display apparatus is a combination of a linear polarizer, a half-wave plate, and a quarter-wave plate.

In an embodiment of the present disclosure, the optical auxiliary layer of the display apparatus is a multilayer structure formed by a plurality of high refractive index material layers and a plurality of low refractive index material layers stacked alternately.

In an embodiment of the present disclosure, the first display panel and the second display panel of the display apparatus each have a light-exit surface, and the optical auxiliary layer is more overlapped on the light-exit surface of the first display panel and the light-exit surface of the second display panel.

In an embodiment of the present disclosure, at least one light-absorbing layer of the display apparatus includes a first light-absorbing layer and a second light-absorbing layer, and the first light-absorbing layer and the second light-absorbing layer are respectively provided on the first splicing surface and the second splicing surface.

In an embodiment of the present disclosure, the material of the at least one light-absorbing layer of the display apparatus includes epoxy or carbon black-doped silicone material.

Based on the above, in the display apparatus of an embodiment of the present disclosure, a light-absorbing layer is provided on at least one of: the first splicing surface of the first display panel for splicing the second display panel, and the second splicing surface of the second display panel for splicing the first display panel. The visibility of the splicing seam between the first display panel and the second display panel may be reduced accordingly, which helps improve the display quality of the display apparatus.

BRIEF DESCRIPTION OF THE DRAWINGS

FIG. 3 is a schematic top view of a display apparatus according to a second embodiment of the present disclosure.

FIG. 4 is a partial enlarged schematic diagram of the display apparatus of FIG. 3.

DESCRIPTION OF THE EMBODIMENTS

Figure 1:
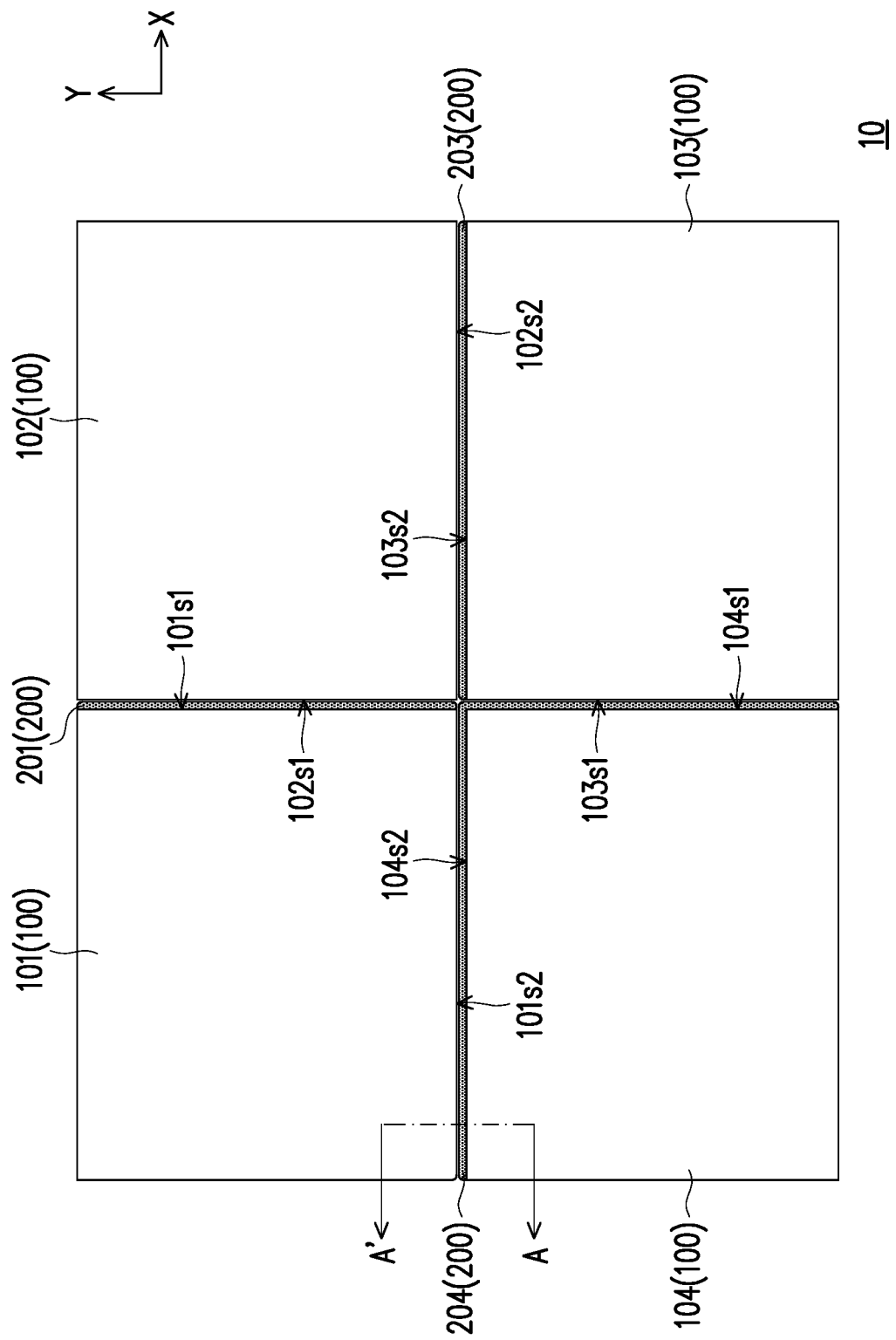
FIG. 1 is a schematic top view of a display apparatus according to a first embodiment of the present disclosure.

The usages of "approximately," "similar to," "essentially" or "substantially" indicated throughout the specification include the indicated value and an average value having an acceptable deviation range, which is a certain value confirmed by people skilled in the art, and is a certain amount considered the discussed measurement and measurement-related deviation (that is, the limitation of measurement system). For example, "approximately" may indicate to be within one or more standard deviations of the indicated value, such as being within ±30%, ±20%, ±15%, ±10%, or ±5%. Furthermore, the usages of "approximately," "similar to," "essentially" or "substantially" indicated throughout the specification may refer to a more acceptable deviation scope or standard deviation depending on measurement properties, cutting properties, or other properties, and all properties may not be applied with one standard deviation.

In the drawings, for clarity, the thickness of layers, films, plates, areas, and the like are magnified. It should be understood that when an element such as a layer, a film, an area, or a substrate is indicated to be "on" another element or "connected to" another element, it may be directly on another element or connected to another element, or an element in the middle may exist. In contrast, when an element is indicated to be "directly on another element" or "directly connected to" another element, an element in the middle does not exist. For example, "to connect" indicated in the specification may indicate to physically and/or electrically connect. Furthermore, "to electrically connect" may also be used when other elements exist between two elements.

References of the exemplary embodiments of the disclosure are to be made in detail. Examples of the exemplary embodiments are illustrated in the drawings. When applicable, the same reference numerals in the drawings and the descriptions indicate the same or similar parts.

Figure 2:
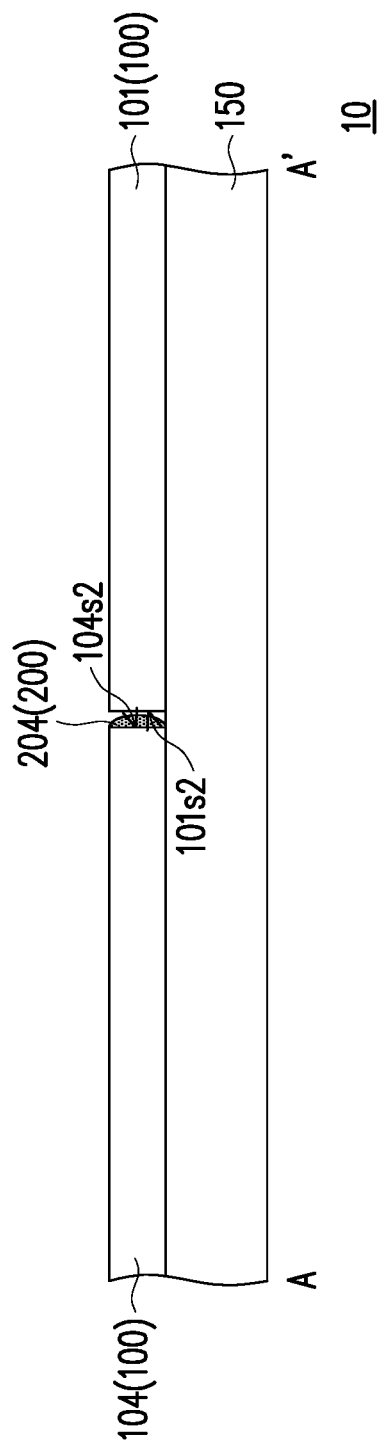
FIG. 2 is a schematic cross-sectional view of the display apparatus of FIG. 1.

FIG. 1 is a schematic top view of a display apparatus according to a first embodiment of the present disclosure. FIG. 2 is a schematic cross-sectional view of the display apparatus of FIG. 1. Note that FIG. 2 corresponds to the section line A-A' in FIG. 1. For the sake of clarity, FIG. 1 omits to show the fixing mechanism 150 of FIG. 2. In FIG. 1 and FIG. 2, the display apparatus 10 includes a plurality of display panels 100 and a plurality of light-absorbing layers 200. These display panels 100 may be connected side by side with each other in at least one direction to form spliced display apparatus.

The number of the display panels 100 of the display apparatus 10 is, for example, four in this embodiment, and they are the first display panel 101, the second display panel 102, the third display panel 103, and the fourth display panel 104. It should be understood that, in other embodiments, the number of display panels 100 of the display apparatus can also be adjusted based on the actual product design, and the present disclosure is not limited by the disclosure of the figures. Furthermore, although the overall outline of the display panel 100 of this embodiment is presented as a rectangle, the top-view profile of the display panel in other embodiments can also be adjusted to a triangle, polygon, or irregular shape based on the product design or application requirements. In other words, the top view profile of the display panel includes straight line segments, arc line segments, or a combination thereof.

In this embodiment, the display panels 100 of the display apparatus 10 may be disposed adjacently respectively along a direction X and a direction Y. For example: the first display panel 101 and the second display panel 102 are disposed along the direction X and spliced to each other; the first display panel 101 and the fourth display panel 104 are disposed along the direction Y and spliced to each other; the second display panel 102 and the third display panel 103 are disposed along the direction Y and spliced to each other; the third display panel 103 and the fourth display panel 104 are disposed along the direction X and spliced to each other.

A plurality of light-absorbing layers 200 are provided between the display panels 100 to reduce the visibility of the splicing seam between the display panels 100. In this embodiment, any two adjacent display panels each have two splicing surfaces facing each other, and one of the two splicing surfaces is provided with a light-absorbing layer 200, but the disclosure is not limited thereto. For example, the first display panel 101 and the second display panel 102 spliced to each other in the direction X respectively have a first splicing surface $101s1$ and a second splicing surface $102s1$ facing each other, and the first splicing surface $101s1$ of the first display panel 101 is provided with a light-absorbing layer 201. Similarly, the second display panel 102 and the third display panel 103 spliced to each other in the direction Y respectively have a third splicing surface $102s2$ and a fourth splicing surface $103s2$ facing each other, and the fourth splicing surface $103s2$ of the third display panel 103 is provided with a light-absorbing layer 203. In other words, in this embodiment, the second splicing surface $102s1$ and the third splicing surface $102s2$ for splicing the second display panel 102 respectively to the first display panel 101 and the third display panel 103 are not provided with a light-absorbing layer 200, but the disclosure is not limited thereto.

Note that the third display panel 103 and the fourth display panel 104 that are spliced to each other in the direction X respectively have a fifth splicing surface $103s1$ and a sixth splicing surface $104s1$ facing each other, the sixth splicing surface $104s1$ of the fourth display panel 104 is provided with a light-absorbing layer 204. The fourth display panel 104 and the first display panel 101 spliced to each other in the direction Y respectively have a seventh splicing surface $104s2$ and an eighth splicing surface $101s2$ facing each other. The seventh splicing surface $104s2$ of the fourth display panel 104 is provided with a light-absorbing layer 204. In other words, in this embodiment, the fifth splicing surface $103s1$ of the third display panel 103 and the eighth splicing surface $101s2$ of the first display panel 101 are not provided with a light-absorbing layer 200, but the disclosure is not limited thereto.

However, the present disclosure is not limited to the aforementioned. In other embodiments, at least one splicing surface of each display panel 100 of the display apparatus for splicing other display panels 100 is provided with a light-absorbing layer 200. For example: the first splicing surface $101s1$ of the first display panel 101 for splicing the second display panel 102, the third splicing surface $102s2$ of the second display panel 102 for splicing the third display panel 103, the fifth splicing surface $103s1$ of the third display panel 103 for splicing the fourth display panel 104, and the seventh splicing surface $104s2$ of the fourth display panel 104 for splicing the first display panel 101 are provided with a light-absorbing layer 200, whereas the eighth splicing surface $101s2$ of the first display panel 101 for splicing the fourth display panel 104, the second splicing surface $102s1$ of the second display panel 102 for splicing the first display panel 101, the fourth splicing surface $103s2$ of the third display panel 103 for splicing the second display panel 102, and the sixth splicing surface $104s1$ of the fourth display panel 104 for splicing the third display panel 103 are not provided with a light-absorbing layer 200.

In this embodiment, the optical density (OD) of the light-absorbing layer 200 may be 0.5 or more to reduce effectively the visibility of the splicing seam between two adjacent display panels, thereby improving the display quality of the display apparatus 10. From another point of view, the optical density of the light-absorbing layer 200 may be 4 or less to increase the concealment of the light-absorbing layer 200 when the display apparatus 10 is in a bright state. In a preferred embodiment, the optical density of the light-absorbing layer 200 is within the range of 0.5 to 2. In this embodiment, the material of the light-absorbing layer 200 includes, for example, an epoxy or a carbon black-doped silicone.

Furthermore, the display apparatus 10 may also include optionally a fixing mechanism 150 configured to carry the aforementioned display panels 100. For example, the fixing mechanism 150 may be provided with a plurality of fasteners, a plurality of magnetic attraction members, or a plurality of adhesive members to fix the display panels 100 that are spliced to each other, but the disclosure is not limited thereto.

Some other embodiments are listed below to describe the disclosure Specifically speaking, and the same components are marked with the same symbols. The description of the same technical content are omitted. For the omitted parts, please refer to the foregoing embodiments as the same is not repeated hereafter.

Figure 5:
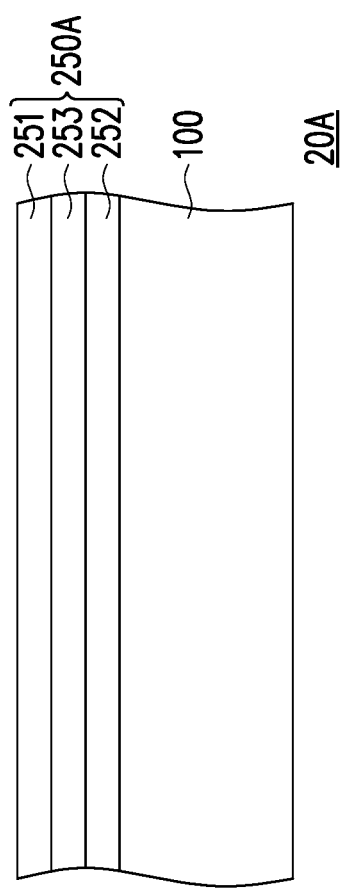
FIG. 5 is a schematic cross-sectional view of a display apparatus according to another embodiment of the disclosure.
Figure 6:
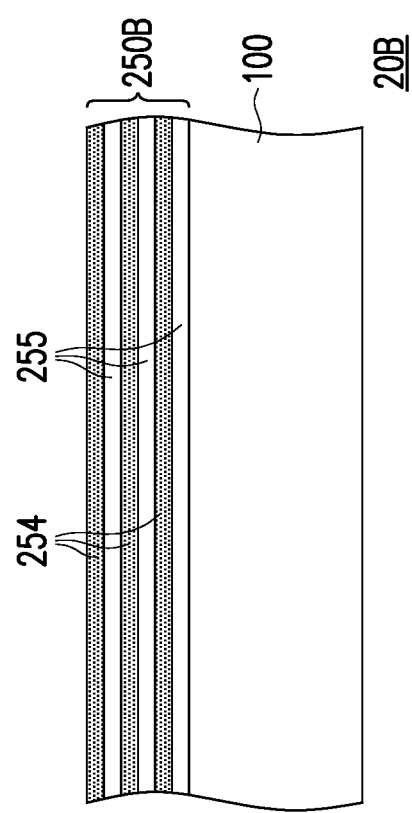
FIG. 6 is a schematic cross-sectional view of a display apparatus according to yet another embodiment of the disclosure.
Figure 7:
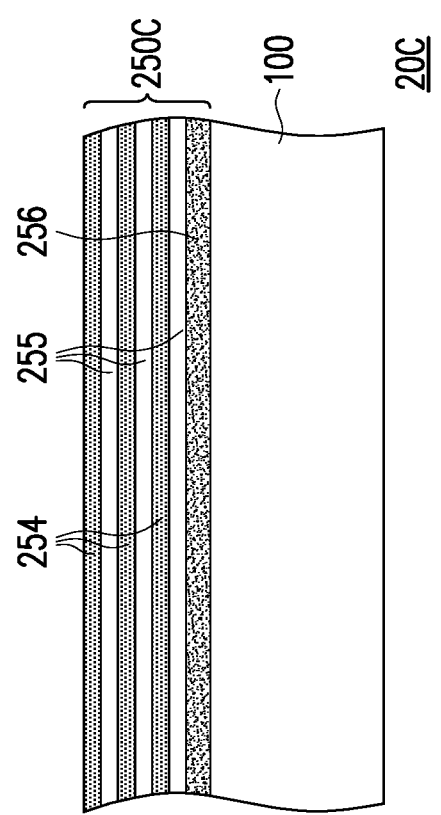
FIG. 7 is a schematic cross-sectional view of a display apparatus according to still another embodiment of the present disclosure.

FIG. 3 is a schematic top view of a display apparatus according to a second embodiment of the present disclosure. FIG. 4 is a partial enlarged schematic diagram of the display apparatus of FIG. 3. FIG. 5 is a schematic cross-sectional view of a display apparatus according to another embodiment of the disclosure. FIG. 6 is a schematic cross-sectional view of a display apparatus according to yet another embodiment of the disclosure. And FIG. 7 is a schematic cross-sectional view of a display apparatus according to still another embodiment of the present disclosure. Please refer to FIG. 3 and FIG. 4. The difference between the display apparatus 20 of the present embodiment and the display apparatus 10 of FIG. 2 is that the display apparatus 20 further includes an optical auxiliary layer 250 overlapping a plurality of light-absorbing layers 200. Specifically speaking, the display panel 100 has a light-exit surface 100e, and the optical auxiliary layer 250 overlaps the light-absorbing layers 200 in the normal direction (for example, the direction Z) of the light-exit surface 100e. In this embodiment, the optical auxiliary layer 250 further overlaps the light-exit surfaces 100e of the display panels 100, but the disclosure is not limited thereto. It is worth mentioning that the reflectivity through the optical auxiliary layer 250 is 6% or less, which further improves the visibility of the splicing seam between the display panels 100 at different viewing angles. For example, in this embodiment, the optical auxiliary layer 250 is a combination of a linear polarizer 251 and a quarter-wave plate 252 (i.e., a circular polarizer), and the quarter-wave plate 252 is disposed between the display panel 100 and the linear polarizer 251, but the disclosure is not limited thereto. In another embodiment, an optical auxiliary layer 250A of a display apparatus 20A may further include a half-wave plate 253, and the half-wave plate 253 is disposed between the linear polarizer 251 and the quarter-wave plate 252 (as shown in FIG. 5).

In another embodiment, an optical auxiliary layer 250B of a display apparatus 20B may also be a multilayer structure formed by a plurality of high refractive index material layers 254 and a plurality of low refractive index material layers 255 stacked alternately (as shown in FIG. 6), where the high refractive index material layer 254 is a metal oxide (for example, titanium dioxide) with a refractive index higher than 2, and the low refractive index material layer 255 is a silicon oxide (for example, silicon dioxide) with a refractive index lower than 1.6. In other words, the optical auxiliary layer 250B is, for example, an anti-reflection layer, but the disclosure is not limited thereto.

In another modification of the display apparatus 20B, in order to further reduce the overall reflectivity of a display apparatus 20C in relation to the external ambient light. Its optical auxiliary layer 250C may optionally include an atomization layer 256, which is disposed between the optical auxiliary layer 250B (i.e., the anti-reflection layer) of FIG. 6 and the display panel 100 (as shown in FIG. 7). However, the present disclosure is not limited thereto. In other embodiments, the atomization layer 256 may also be disposed between the optical auxiliary layer 250 (for example, a circular polarizer) and the display panel 100 in FIG. 4.

Figure 8:
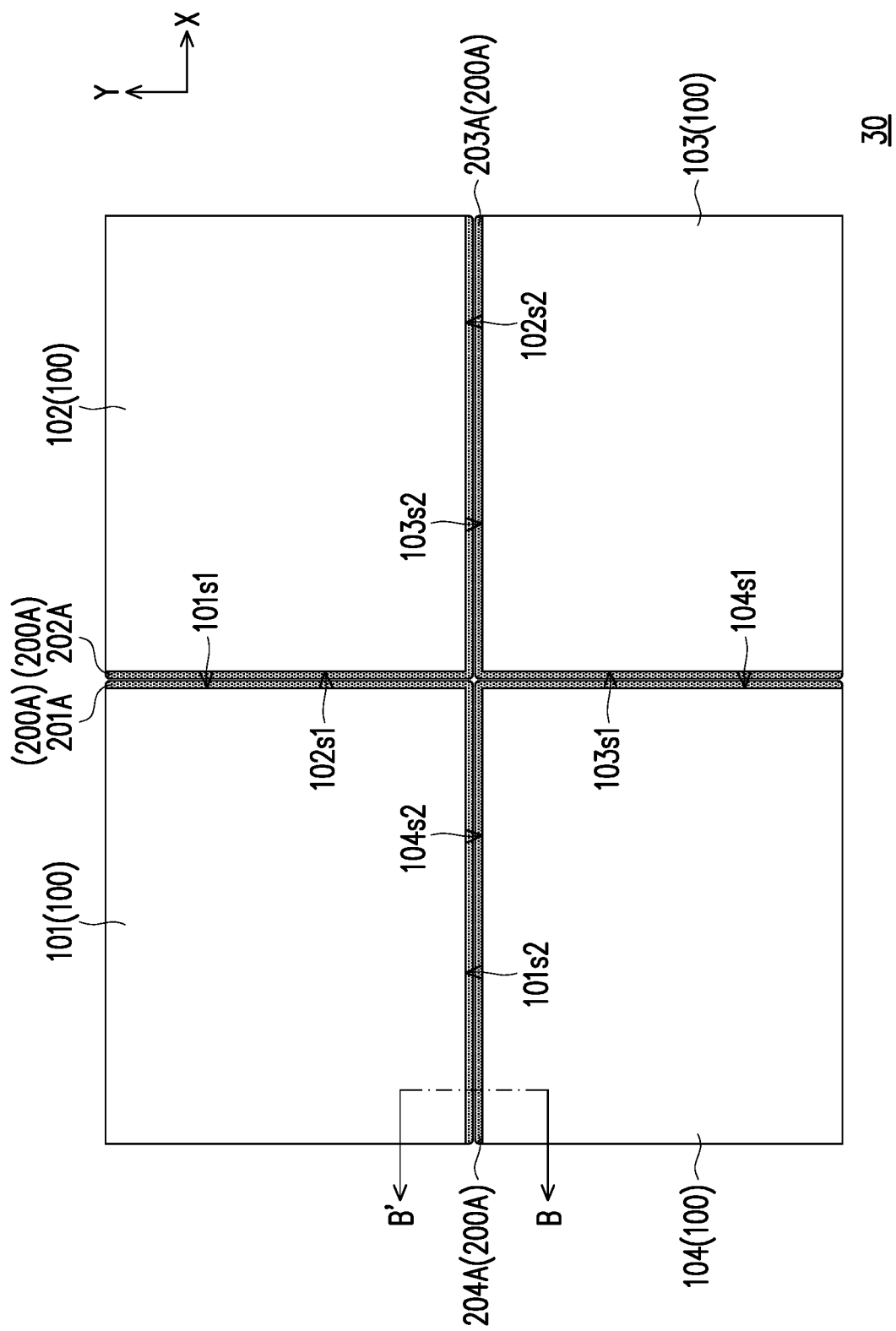
FIG. 8 is a schematic top view of a display apparatus according to a third embodiment of the present disclosure.
Figure 9:
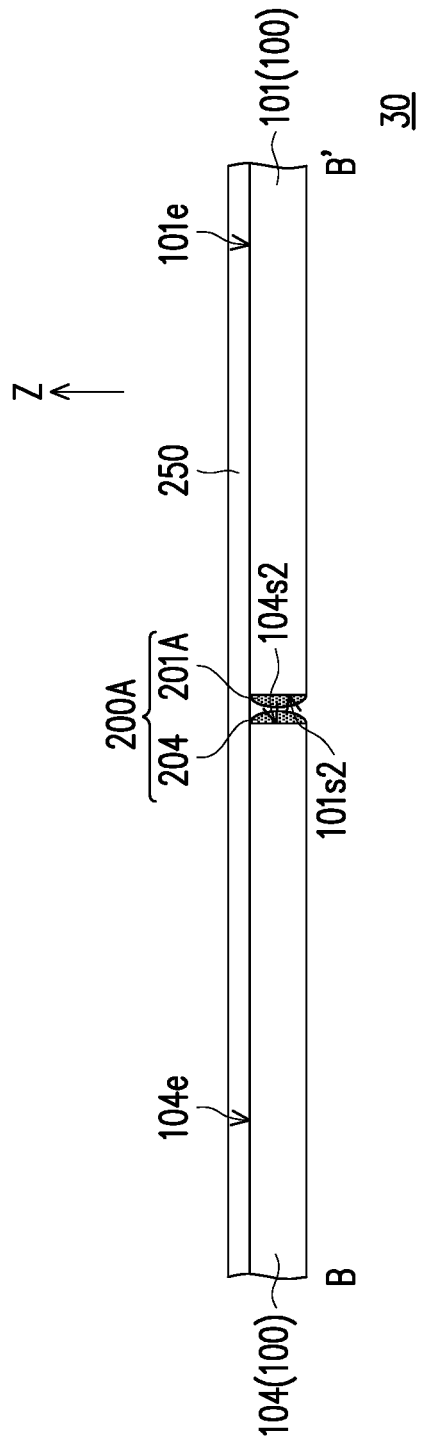
FIG. 9 is a schematic cross-sectional view of the display apparatus of FIG. 8.

FIG. 8 is a schematic top view of a display apparatus according to a third embodiment of the present disclosure. FIG. 9 is a schematic cross-sectional view of the display apparatus of FIG. 8. FIG. 9 corresponds to the section line BB' of FIG. 8. Please refer to FIG. 8 and FIG. 9. The main difference between the display apparatus 30 of this embodiment and the display apparatus 10 of FIG. 1 is that they have different configuration of the light-absorbing layer. In this embodiment, all splicing surfaces of each display panels 100 of the display apparatus 30 adapted for splicing other display panels 100 are provided with a light-absorbing layer 200A. Accordingly, the visibility of the splicing seam between two adjacent display panels may be further reduced, thereby improving the display quality of the display apparatus 30. In addition, it also makes the selection of the material of the light-absorbing layer 200A or the splicing process of the display panel 100 more flexible.

For example: the first splicing surface 101$s$1 and the eighth splicing surface 101$s$2 of the first display panel 101 for splicing the second display panel 102 and the fourth display panel 104 are both provided with a light-absorbing layer 201A; the second splicing surface 102$s$1 and the third splicing surface 102$s$2 of the second display panel 101 for splicing the first display panel 101 and the third display panel 103 are both provided with a light-absorbing layer 202A; the fourth splicing surface 103$s$2 and the fifth splicing surface 103$s$1 of the third display panel 103 for splicing the second display panel 102 and the fourth display panel 104 are both provided with a light-absorbing layer 203A; and the seventh splicing surface 104$s$2 and the sixth splicing surface 104$s$1 of the fourth display panel 104 for splicing the first display panel 101 and the third display panel 103 are both provided with a light-absorbing layer 204.

On the other hand, it is possible for the display apparatus 30 of this embodiment to not have the fixing mechanism 150 of the display apparatus 10 in FIG. 2. For example, in this embodiment, the optical auxiliary layer 250 of the display apparatus 30 may also be adapted as a fixing layer after the display panels 100 are spliced to each other. More specifically, these display panels 100 may be attached to the optical auxiliary layer 250 via an adhesive layer, but the disclosure is not limited thereto. In other embodiments, the surface of the optical auxiliary layer 250 facing away from the display panel 100 may also be provided with a glass cover to increase the stiffness of the spliced display apparatus.

In summary, in the display apparatus of an embodiment of the present disclosure, a light-absorbing layer is provided on at least one of: the first splicing surface of the first display panel for splicing the second display panel, and the second splicing surface of the second display panel for splicing the first display panel. The visibility of the splicing seam between the first display panel and the second display panel may be reduced accordingly, which helps improve the display quality of the display apparatus.

What is claimed is:
1. A display apparatus, comprising:
 a first display panel, having a first splicing surface;
 a second display panel, having a second splicing surface opposite to the first splicing surface;

at least one light-absorbing layer, disposed on at least one of the first splicing surface and the second splicing surface; and an optical auxiliary layer, overlapping the at least one light-absorbing layer, wherein the reflectivity of the optical auxiliary layer is 6% or less, and the optical auxiliary layer is a multilayer structure formed by a plurality of high refractive index material layers and a plurality of low refractive index material layers stacked alternately.

2. The display apparatus according to claim 1, wherein the optical density of the at least one light-absorbing layer is 0.5 or more.

3. The display apparatus according to claim 2, wherein the optical density of the at least one light-absorbing layer is 4 or less.

4. The display apparatus according to claim 1, wherein the first display panel and the second display panel each have a light-exit surface, and the optical auxiliary layer is more overlapped on the light-exit surface of the first display panel and the light-exit surface of the second display panel.

5. The display apparatus according to claim 1, wherein the at least one light-absorbing layer comprises a first light-absorbing layer and a second light-absorbing layer, and the first light-absorbing layer and the second light-absorbing layer are respectively provided on the first splicing surface and the second splicing surface.

6. The display apparatus according to claim 1, wherein the material of the at least one light-absorbing layer comprises epoxy or carbon black-doped silicone material.

* * * * *